Aug. 8, 1933.     E. A. NORMAND     1,921,694
CHUCK
Filed May 10, 1932
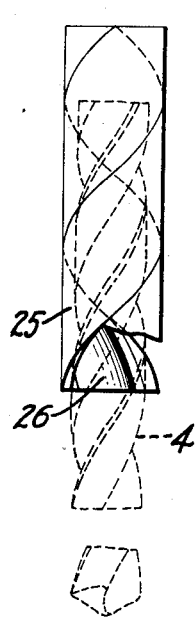
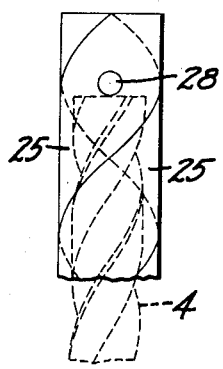
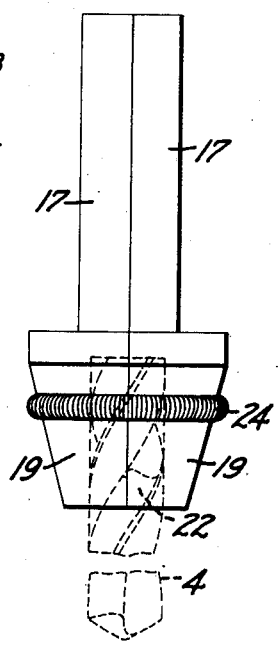
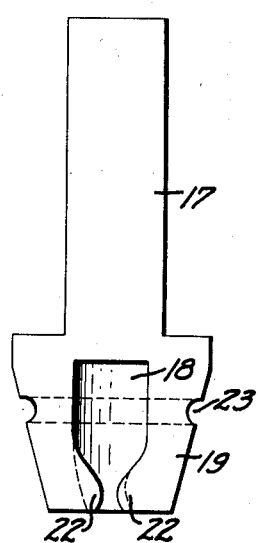
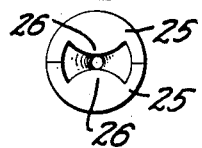
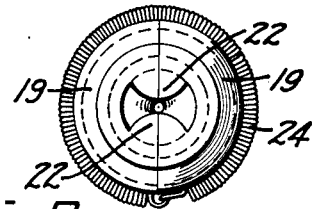
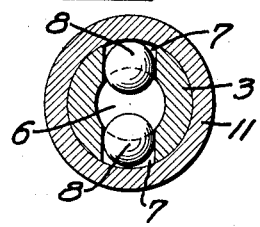
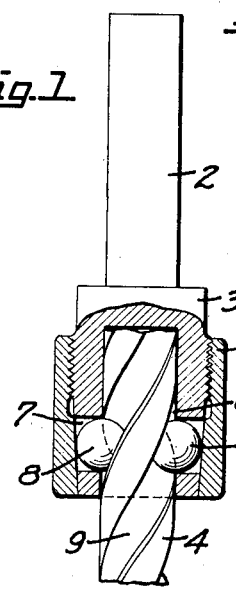
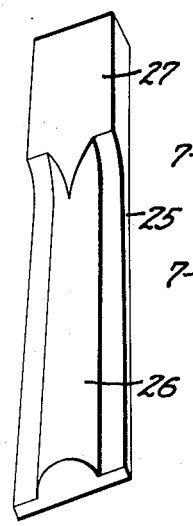
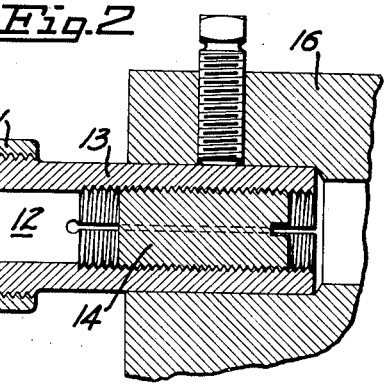
INVENTOR.
ERNEST A. NORMAND
BY Charles S. Evans
HIS ATTORNEY Patented Aug. 8, 1933

1,921,694

UNITED STATES PATENT OFFICE 1,921,694

CHUCK

Ernest A. Normand, San Francisco, Calif., assignor to Emile H. Normand, San Francisco, Calif.

Application May 10, 1932. Serial No. 610,478

1 Claim. (Cl. 279—93)

My invention relates to a chuck, and particularly to a chuck for gripping a fluted tool.

It is among the objects of my invention to provide a chuck having locking means for engaging a flute in the tool, so that a squared or other special shank end on the tool is unnecessary in the operation of the chuck.

Another object of my invention is to provide a chuck for holding broken tools, such as a broken twist drill.

Another object of my invention is to provide a chuck in which the length of tool projecting from the chuck may be selectively varied.

A further object of my invention includes the provision, in a chuck of the character described, of means for preventing the tool from dropping out of the chuck.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claim.

Referring to the drawing:

Figure 1 is a side view, partly in section and partly in elevation, showing the preferred form of chuck embodying my invention; and Figure 2 is a chuck having a gripping head similar to that shown in Figure 1, but having a variant form of shank construction.

Figure 3 is a transverse vertical sectional view of the head taken in a plane indicated by the lines 3—3 of Figure 2.

Figure 4 is a different type of chuck embodying the improvements of my invention; and Figure 5 shows a half portion of the same.

Figure 6 is an end view showing the head construction of the chuck illustrated in Figure 4.

Figure 7 is another variant form of chuck embodying my invention; and

Figure 8 is an end view of the same.

Figure 9 shows one of the blanks used in making the chuck illustrated in Figure 7.

Figure 10 is another form of chuck differing slightly from the construction shown in Figure 7.

In terms of broad inclusion, the chuck embodying my invention comprises a recessed holder for receiving the shank of a fluted tool, and a locking element mounted on the holder and projecting into the recess for engaging a flute in the tool. The locking element is preferably in the nature of a ball seated in the holder, and means are preferably provided for adjusting the ball relative to its distance from the center of the recess so that the ball may be forced against the tool shank to prevent the tool from dropping out of the chuck. By this construction a tool having merely a fluted shank to be engaged with, such as a broken twist drill, may be securely held. Means are also preferably provided in the chuck for selectively varying the length of tool projecting from the chuck.

In greater detail, and referring particularly to Figures 1 and 3, the preferred form of chuck embodying my invention comprises a holder having a shank portion 2 and an enlarged head portion 3; the latter being recessed to receive the fluted end of a tool, such as the twist drill 4. The base of the tool receiving recess 6 terminates in the head 3 and provides a seat against which the base end of the tool 4 is adapted to bear. The chuck head is preferably cross drilled to provide a pair of oppositely disposed apertures 7 opening into the recess 6. A locking element or ball 8 is seated in each of the apertures 7, and projects into the recess for engaging a flute 9 in the tool. These balls preferably have a diameter greater than half the width of the recess 6, and are arranged so that each prevents the other from dropping out of the aperture in which it is seated.

Means are also preferably provided for adjusting the locking elements or balls 8 relative to the amount of their separation, so that the balls may be forced against the tool 4 to prevent the tool from dropping out of the chuck. For this purpose the chuck head 3 is preferably tapered, and a sleeve 11, having a tapered surface complementary to the tapered head, is threaded on the head. This construction is best shown in Figure 1, and it will be noted that the sleeve 11 covers the apertures 7 and the tapered surface thereof provides a backing against which the balls 8 are adapted to bear. By turning the sleeve 11 in one direction the locking balls are forced together to clamp against the tool 4, and by turning the sleeve in the opposite direction the balls are allowed to separate to permit ready removal of the tool.

A variant form of the preferred chuck construction is shown in Figure 2, wherein it will be noted that the recess 12 for receiving the tool extends entirely through an enlarged shank portion 13 of the holder. The shank end of the holder is slotted, and is threaded to receive a plug 14. By this arrangement it will be understood that the depth of the recess 12 may be varied by turning the adjusting plug 14. Thus, means are provided for varying the length of tool portion projecting from the chuck. This construction is particularly useful in turret machine work, where it is often desirable to vary the length of the projecting drill portion. When the holder is clamped into the machine head 16 the plug 14 is securely locked in the slotted shank portion 13.

A variant form of chuck construction embodying my invention is shown in Figures 4 to 6, and comprises a split holder having similarly formed half portions 17. A tool receiving recess is provided in the holder, and is formed by a recess 18 formed in the head portion 19 of each holder portion.

The locking elements in this case are fixed to the holder, and are preferably formed by lugs 22 on the holder portions. It is to be noted that the holder is split through the locking elements; note Figure 6. This permits the heads to engage the sides of the tool and hold the same firmly in the chuck. When the holder is formed by forging, as may conveniently be done, the lugs 22 may readily be formed by hammering down lumps of metal provided in the flat surfaces of the heads 19. A groove 23 is preferably provided about the head 19, so that a spring 24 may be inserted to hold the split holder portions in assembled relation.

Still another variant form of chuck embodying my invention is shown in Figures 7 to 9. In this case the holder is built up of a plurality of interfitting helical strips 25, each having a locking flange 26 formed thereon for engaging the flute of the tool. One of the blanks from which the holder is made is shown in Figure 9. The chuck shown in Figure 7 is made by placing two blanks similar to that shown in Figure 9 together with the flanges 26 opposing one another, and then twisting the blanks. The butt portion 27 of the blanks forms the base of the holder, against which the twist drill is adapted to seat.

A slightly different modification of this construction is shown in Figure 10. In this construction it is contemplated that a considerable length of the blank strip be twisted together and then cut into lengths to form the holders. In this case a pin 28 is provided, against which the drill 4 may seat.

I claim:

A chuck for gripping a fluted tool comprising a recessed holder for receiving the tool and having portions projecting into the recess for engaging flutes in said tool, said holder being split longitudinally thereof and through the flute engaging portions.

ERNEST A. NORMAND.